United States Patent
Minami et al.

(10) Patent No.: US 10,445,023 B2
(45) Date of Patent: Oct. 15, 2019

(54) COMMUNICATION APPARATUS AND MEMORY CARD, COMMUNICATION METHOD, AND NON-TRANSITORY COMPUTER READABLE MEDIUM

(71) Applicant: KABUSHIKI KAISHA TOSHIBA, Minato-ku (JP)

(72) Inventors: Keisuke Minami, Kawasaki (JP); Koji Tazoe, Ota (JP); Hiroyuki Aizu, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 228 days.

(21) Appl. No.: 15/249,776

(22) Filed: Aug. 29, 2016

(65) Prior Publication Data

US 2017/0070400 A1 Mar. 9, 2017

(30) Foreign Application Priority Data

Sep. 8, 2015 (JP) ................. 2015-176708

(51) Int. Cl.
*H04L 12/24* (2006.01)
*G06F 3/06* (2006.01)
(Continued)

(52) U.S. Cl.
CPC .......... *G06F 3/0679* (2013.01); *G06F 3/0605* (2013.01); *G06F 3/0632* (2013.01);
(Continued)

(58) Field of Classification Search
None
See application file for complete search history.

(56) References Cited

U.S. PATENT DOCUMENTS 6,178,468 B1 * 1/2001 Rudd .................... G06F 9/4413
707/999.1
7,831,644 B2 * 11/2010 Moritani ............... G06F 3/0605
707/828

(Continued)

FOREIGN PATENT DOCUMENTS

JP 2006-171949 A 6/2006
JP 2014-127014 A 7/2014

OTHER PUBLICATIONS

"CONFIG", FlashAir Developers, <https://flashair-developers.com/en/documents/api/config/>, obtained from the internet on Feb. 10, 2017, 14 Pages.

(Continued)

*Primary Examiner* — Viet D Vu
*Assistant Examiner* — James A Edwards
(74) *Attorney, Agent, or Firm* — Oblon, McClelland, Maier & Neustadt, L.L.P.

(57) ABSTRACT

According to one embodiment, a communication apparatus includes: a hardware interface configured to connect to a device; first controlling circuitry configured to detect the device being connected to the hardware interface and to determine whether a first command has been received by the hardware interface in a first time period after detection of connection to the device; and communication circuitry configured to carry out wireless communication with a terminal. The first controlling circuitry carries out control to select a function for the terminal from a plurality of functions in accordance with whether the first command has been received in the first time period and provide the selected function for the terminal.

10 Claims, 8 Drawing Sheets

(51) Int. Cl.
    H04L 29/08    (2006.01)
    *H04L 29/06*    (2006.01)
(52) U.S. Cl.
    CPC ........ G06F 3/0659 (2013.01); H04L 41/0809 (2013.01); H04L 41/30 (2013.01); H04L 67/125 (2013.01); H04L 67/36 (2013.01); H04L 41/00 (2013.01); H04L 67/02 (2013.01); H04L 67/42 (2013.01)

(56) References Cited

U.S. PATENT DOCUMENTS

2007/0073937 A1* 3/2007 Feinberg ................. G06F 9/445
   710/62
2013/0268802 A1* 10/2013 Ito ....................... G06F 11/0796
   714/6.11
2015/0244798 A1* 8/2015 Bolotin ............... H04L 67/1095
   709/217

OTHER PUBLICATIONS

"Make IoT Devices with FlashAir", FlashAir Developers, <https://flashair-developers.com/en/>, obtained from the internet on Feb. 10, 2017, 20 Pages.

* cited by examiner

COMMUNICATION APPARATUS AND MEMORY CARD, COMMUNICATION METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2015-176708, filed on Sep. 8, 2015; the entire contents of which are incorporated herein by reference.

FIELD

Embodiments described herein relate to a communication apparatus, a communication method, and a non-transitory computer readable medium.

BACKGROUND

Traditional multi-functional memory cards incorporate various functions that can be enabled or disabled independently and selectably. Nevertheless, users may feel inconvenience as their intended function or functions have to be selected as required from among the various functions.

DETAILED DESCRIPTION

According to one embodiment, a communication apparatus includes: a hardware interface configured to connect to a device; first controlling circuitry configured to detect the device being connected to the hardware interface and to determine whether a first command has been received by the hardware interface in a first time period (i.e., within a first time period) after detection of connection to the device; and communication circuitry configured to carry out wireless communication with a terminal. The first controlling circuitry carries out control to select a function for the terminal from a plurality of functions in accordance with whether the first command has been received in the first time period and provide the selected function for the terminal.

Embodiments of the present invention are described below with reference to the drawings.

Figure 1:
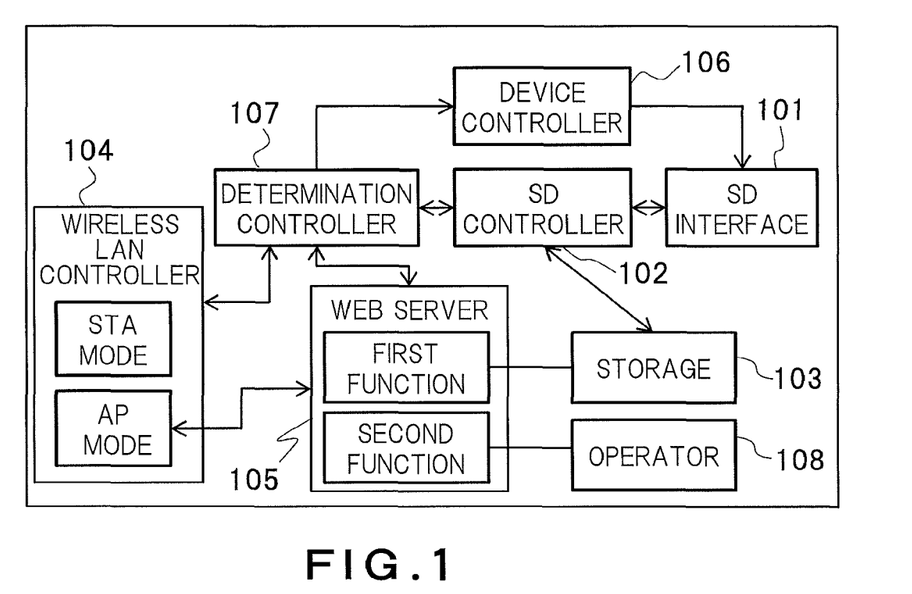
FIG. 1 is a block diagram of a multi-functional memory card including a communication apparatus in accordance with an embodiment of the present invention.
Figure 2:
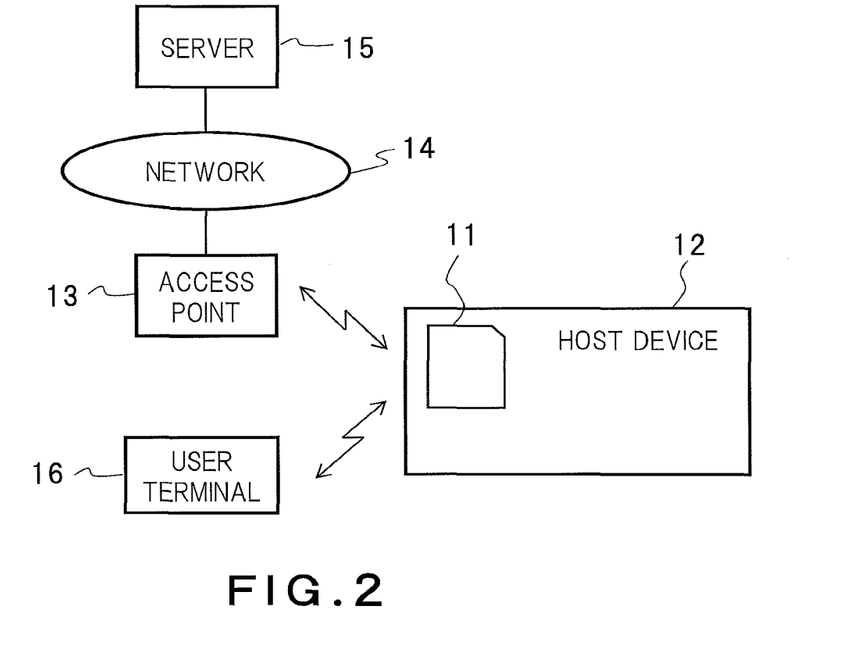
FIG. 2 is a diagram illustrating an example of mode of usage of the multi-functional memory card.

FIG. 1 is a block diagram of a multi-functional memory card that includes a communication apparatus in accordance with an embodiment of the present invention. In this embodiment, the multi-functional memory card is regarded as, but not limited to, an SD memory Card™. FIG. 2 illustrates an example of mode of usage of this multi-functional memory card (hereinafter referred to as "memory card").

As illustrated in FIG. 2, this memory card 11 is connected to and used with an appropriate host device 12 such as a digital camera, a personal computer, an AC adapter, a microcomputer board, home appliances, and the like. The memory card 11 includes a function to carry out wireless communications such as wireless LAN, etc. (a wireless LAN is envisaged). The memory card 11 includes an AP mode and an STA (STAtion) mode. When the STA mode is entered, the memory card 11 operates as a wireless LAN terminal. For example, the memory card 11 placed in the STA mode carries out wireless communications, for example, via an access point 13 with a server 15 on a network 14 such as the Internet. The access point 13 is a base station on the wireless LAN (or a wireless LAN router) or the like. Also, when the AP mode is entered, the memory card 11 operates as an access point of the wireless LAN. The memory card 11 placed in the AP mode carries out communications with a terminal 16 (hereinafter referred to as "user terminal"). The user terminal is a wireless LAN terminal. The memory card 11 can provide various functions including: a function that allows the host device 12 to use the memory card 11 as a communication interface and carry out communications with the server 15; a function that allows the user terminal 16 to control the host device 12 via the memory card 11; a function that enables the user terminal 16 to display data stored in the memory card 11 on the terminal itself and edit the displayed data; and a function that enables the user terminal 16 to perform wireless LAN operation setting and parameter setting in the memory card 11. One of the features of this embodiment lies in the fact that the memory card 11 carries out automatic selection of the function to be provided, wherein the automatic selection is made in accordance with the type of the host device 12 connected to this memory card, and the memory card 11 provides the selected function to the user. The memory card 11 with such a configuration is described in detail below.

As illustrated in FIG. 1, the memory card includes an SD interface 101, an SD controller 102, a storage 103, a wireless LAN controller (wireless communicator) 104, a Web server 105, a device controller 106, a determination controller 107, and an operator 108. The determination controller may be configured by first controlling circuitry, the device controller 106 may be configured by second controlling circuitry, a Web server 105 may be configured by server circuitry and the wireless communicator 104 may be configured by communication circuitry. The "circuitry" may refer to not only electric circuits or a system of circuits used in a device but also a single electric circuit or a part of the single electric circuit. The interface 101 may be configured as a hardware interface.

The SD interface 101 is an interface for connection to a host device which is an external device. The "host device" as used herein may encompass, though not limited to, a digital camera, a personal computer, an AC adapter, a microcomputer board, home appliances, and the like. This memory card is connected to the host device, by way of example, by being inserted into a connector of the host device. More specifically, the memory card is connected to the host device via the SD interface 101. The SD interface 101 includes a communication bus and a power feed bus. The SD interface 101 has a function of carrying out communications with the host device and a function of receiving power fed by the host device. When the SD interface 101 is connected to the host device, power supply to this memory card is started.

The wireless LAN controller 104 is configured to carry out communication with a terminal (i.e., a station), the access point (base station), or the like on the wireless network by wireless signals in accordance with a predetermined wireless communication scheme. It is assumed in this embodiment that the operation is compliant with, by way of example and not limited to, the IEEE802.11 standard. The wireless LAN controller 104 includes the STA mode and the AP mode which have been described above.

When the STA mode is entered, the memory card operates as a wireless LAN terminal (i.e., a station) and establishes connection to the access point of the wireless LAN to carry out communications with a server on an external network. For example, the memory card sends an acquisition request to get data to the server and receives an acquisition response that includes the data. Also, the memory card receives a control instruction, etc. directed to a home appliance, etc. from the server. When the AP mode is entered, the memory card operates as an access point of the wireless LAN and, for example, receives access requests to access various functions disclosed on the Web server 105, for example, from a terminal (user terminal) of the wireless LAN. The STA mode and the AP mode may be controlled to be individually enabled or disabled (activated or deactivated). The STA mode and the AP mode may be simultaneously enabled.

The storage 103 is configured to store data. A setting file that specifies the operation of this memory card may be stored in the storage 103. The setting file may include parameters to be used in the AP mode and in the STA mode (SSID, security key (encryption key), encryption type, etc.) and the like. The storage 103 is configured, by way of example, by non-volatile memory such as NAND flash memory, MRAM, FRAM. However, the storage 103 may be configured by volatile memory such as SRAM, DRAM. Also, it may be configured by combining non-volatile memory and volatile memory.

The Web server 105 includes a function (first function) that enables data in the storage 103 to be displayed and/or edited and at least one function (second function) of receiving various instructions other than the first function and executing processing processes in accordance with the instructions. The second function allows the processing processes to be carried out by using the operator 108. The operator 108, which is a processor such as a CPU or an arithmetic device, is configured to execute commands given to the operator 108 and returns execution results. For example, the operator 108 receives an instruction of arithmetic commands to perform addition, multiplication, and the like, executes operations in accordance with the arithmetic commands, and returns the execution results. In addition, the operator 108 is capable of executing arbitrary operations such as file search. The second function may use a part of the area of the storage 103 as the temporary work area at the time of the processing or may use a memory unit that serves as another work area independent of the storage 103. The first function and the second function may be configured such that whether these functions are to be enabled or disabled may be independently controlled. Also, the functions provided in this embodiment are not limited to the functions provided by the Web server 105.

The SD controller 102 is configured to control the SD interface 101 and thereby communicate with the host device. The SD controller 102 receives various commands (instructions) from the host device and performs operations in accordance with the commands. For example, the SD controller 102 receives a command to write/read data to/from the storage 103 and returns the result of execution of the command to the host device. For example, the SD controller 102 receives from the host device a command to write information indicative of the internal state of the host device or operation history information, and writes the information in the storage 103 by the execution of the command. Any appropriate information may be used as the information indicative of the internal state of the device. For example, if the device is an air conditioner, the information may be set temperature of the air conditioner, temperature and humidity of a room, presence of abnormality, and the like.

The device controller 106 is configured to control the SD interface 101 under the control of the determination controller 107 and transmit a command for controlling the host device (device control command). The above-described SD controller 102 operates basically in accordance with a slave function according to which the SD controller 102 receives a command from the host device, executes the command, and returns a response. In contrast, the device controller 106 operates basically in accordance with a master function controlling the host device. The response to the device control command is received by the SD controller 102, and the response or the fact that the response has been received may be notified to the determination controller 107 or the device controller 106.

The determination controller 107 is configured to determine a device type of the host device connected to the SD interface 101 by using the device controller 106 and the SD controller 102, and configured to control the device controller 106 and the SD controller 102 such that a function in accordance with the device type can be provided for the terminal. In this embodiment, a first device type, a second device type, a third device type, and a fourth device type are provided as the device types.

The device type 1 is indicative of a device that does not have a wireless communication function by the device itself and carries out wireless communications by using the wireless communication function provided by this memory card, in other words, a device that uses this memory card mainly as a communication interface. The device type 2 is indicative of a device that uses this memory card mainly as a normal memory card (as a storage device). The device type 3 is indicative of a device that can be controlled by the device controller 106 (home appliances, etc.). The device type 4 is indicative of a device other than the above-mentioned devices, i.e., a device that cannot be controlled by the device controller 106 and does not have the function to carry out communications with this memory card. Specifically, this device may include a device that is only used for power supply such as a battery. Details of the device types and the method of determining the device types of host devices will be described later.

This memory card can use the STA mode and the AP mode of the wireless LAN controller 104 and the Web server 105 provides various functions to the terminal (the user terminal) or a user operating the terminal.

For example, setting of the operation modes (AP mode, STA mode, and AP/STA simultaneous mode) of the wireless LAN controller 104 and setting of the parameters of the AP and STA modes (SSID, security key (encryption key), encryption type, and the like) can be made from the user terminal. Also, in the AP mode, the function of the Web server 105 can be provided for the user terminal (operating in the STA mode) connected to this memory card.

It is possible in the STA mode as well to provide the function of the Web server 105 to the local network and provide a function to access via the Internet to a host device connected via a wireless LAN router. In the AP/STA simultaneous mode, both of these functions can be provided and a new function created as a result of the combination of the AP mode and the STA mode can also be provided. On the side of the Web server 105, various functions can be provided for the user by providing to the user terminal user interface screens that can be operated by the user. The Web server 105 provides the corresponding functions on the basis of the instructions input from the user interface screen by the user. For example, a Web page for displaying data stored in the storage 103, a Web page for editing the data stored in the storage 103, a Web page for setting the operation mode and other parameters of the wireless LAN controller 104, a Web page for controlling the host device, and the like can be provided as an interface screen data so that instructions from the user can be received. Transitions among these Web pages may be realized by a link such as hyperlink, etc.

As described above, the memory card includes various functions. It is difficult for the user to select the function he/she may want to use from among these functions relying on the user's input to the setting file and instructions to the Web server 105. In view of this, one of the features of this embodiment lies in the fact that, the device type of the device connected to the SD interface 101 is determined and the function that corresponds to the device type that has been determined is automatically selected and provided.

Figure 3:
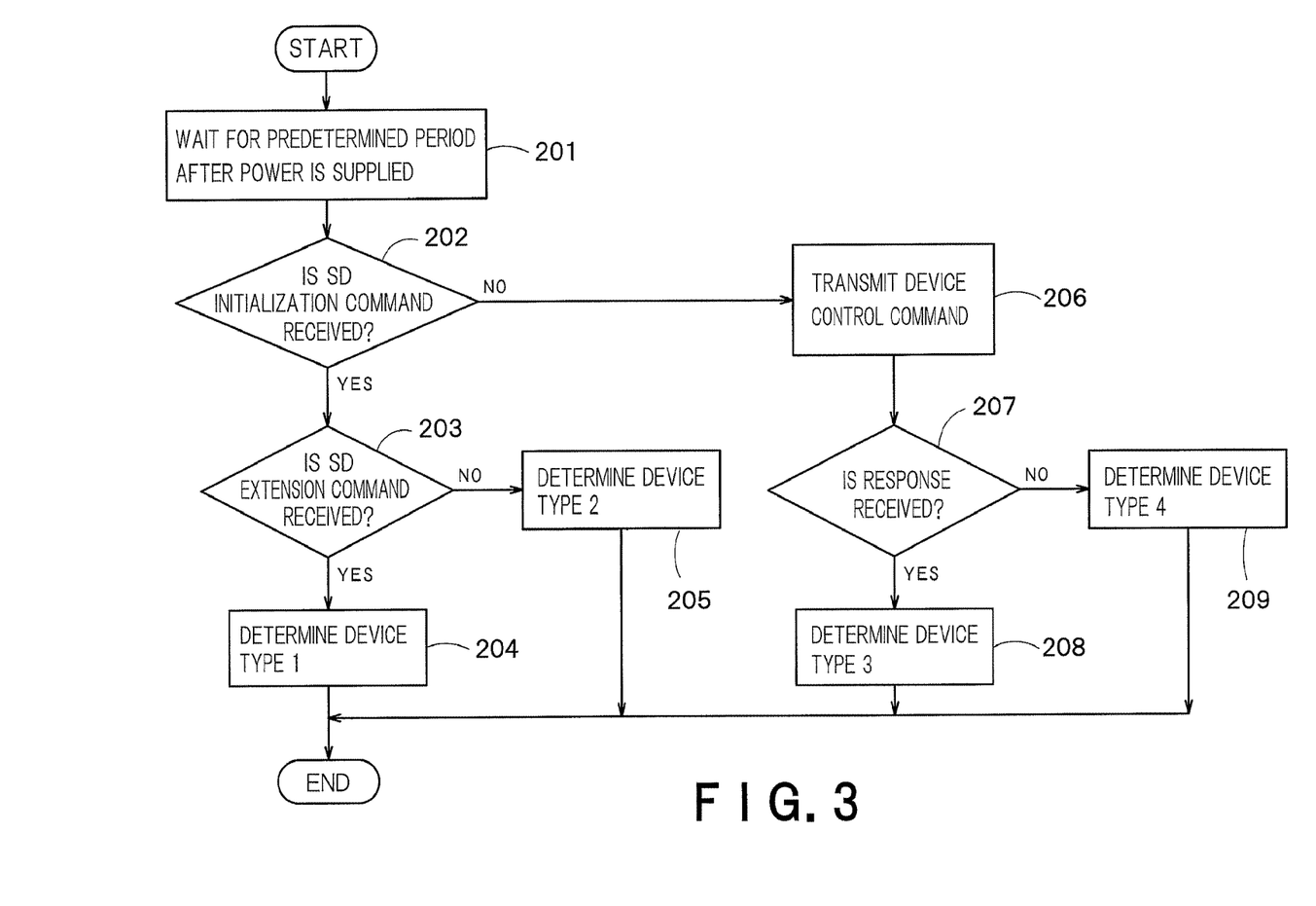
FIG. 3 is a flowchart illustrating an exemplary operation of the multi-functional memory card of FIG. 1.

FIG. 3 is a flowchart that illustrates an exemplary operation of the memory card of FIG. 1. The determination controller 107 detects establishment of connection to the host device in response to memory card being connected to the host device via the SD interface 101 and power being supplied to the memory card. After detection of the connection to the host device, i.e., after power supply is started, the determination controller 107 waits for a predetermined period (step 201). The determination controller 107 checks whether or not an SD initialization command has been received from the host device in the predetermined period (step 202). The SD controller 102, upon reception of the SD initialization command, notifies either the fact that the SD initialization command has been received or the SD initialization command as such to the determination controller 107. The SD initialization command is a command transmitted from the host device when communication compliant with the SD standard is to be started. The SD initialization command corresponds to a communication request by the host device to carry out communication with this memory card. The fact that the SD initialization command was received indicates that the host device that transmits the SD initialization command has the function of carrying out communications with the memory card (transmitting commands to the memory card).

When the SD initialization command has been received, the determination controller 107 checks whether or not an SD extension command was received from the host device after reception of the SD initialization command (step 203). The SD extension command is a command defined by iSDIO (intelligent SDIO) standard and used in handling functions on the memory card other than the function to read/write to/from the storage 103. Specifically, it controls the wireless LAN controller 104 and instructs either one or both of connection to the wireless LAN access point and HTTP communication with a server on the Internet.

When the SD extension command has been received, the determination controller 107 determines that a host device with the device type 1 is connected to the SD interface 101 (step 204). The device type 1 is defined as being indicative of a device that does not have a wireless communication function by the host device itself as a host device and uses this memory card mainly as its communication interface. Specifically, this device indicated by the device type 1 may include a microcomputer board or the like that is designed for development and does not have a wireless LAN interface. This is because the fact that the SD extension command is transmitted indicates that the host device, to which the memory card is connected, does not have the wireless communication function by the device itself.

Meanwhile, when the SD extension command is not received from the host device, to which the memory card is connected, the determination controller 107 determines that a host device with the device type 2 is connected to the SD interface 101 (step 205). The device type 2 is defined as indicating a device that uses the memory card mainly as a normal memory card (storage device). Specifically, the host device intended in this context may be a digital camera or a digital video camera with a communication function, a PC, and the like. This is because the fact that the SD extension command is not transmitted indicates that the host device, to which the memory card is connected, is the device itself and has the wireless communication function. A time limit may be defined for the reception of the SD extension command and, for example, it may be determined that the SD extension command was not received when an SD extension command is not received within a predetermined period after the reception of the SD initialization command.

When the SD initialization command was not received, the determination controller 107 instructs the device controller 106 to transmit the device control command to the host device. The device controller 106 upon reception of the instruction controls the SD interface 101 and transmits the device control command to the host device (step 206).

At this point, the device controller 106 controls the SD interface 101 in accordance with a communication scheme that is different from that of the SD controller 102 and carries out transmission of a device control command and reception of a response thereto or any other relevant processing processes. The communication scheme that is different from that of the SD controller 102 as used herein denotes, for example, GPIO, PWM, SPI (master side), I2C, UART, or the like. In other words, the SD controller 102 carries out control for the case where the memory card operates as a slave device with respect to the host device. Meanwhile, the device controller 106 carries out control for the case where the memory card operates as a master device in relation to the host device. Hence, the communication schemes to be used should also be different from each other depending on these cases.

After transmission of the device control command, the determination controller 107 checks whether or not a response is received from the host device (step 207). When the response has been received from the host device, the determination controller 107 determines that a device with the device type 3 is connected to the SD interface 101 (208).

The device type 3 is indicative of a device that can be controlled by the device controller 106 (i.e., a device that can be controlled by this memory card). Specifically, home appliances such as a light fixture and an air conditioner, and embedded platforms that include a sensor, an actuator, and the like may be mentioned. Making a response to the device control command implies that the device that returned this response can be controlled by the memory card.

Meanwhile, when a response to the device control command is not received from the host device after the transmission of the device control command, then the determination controller 107 determines that a device with the device type 4 is connected to the SD interface 101 (step 209). The device type 4 is indicative of a device that cannot be controlled by the device controller 106 and does not have the function of carrying out communications with the memory card. By way of example, a device that is only intended for power supply, specifically, a mobile battery or an AC adapter may be mentioned. The fact that the response to the device control command is not received implies that the host device cannot be controlled by the memory card. Also, since the SD initialization command is not received either in the step 202, this implies that the device at issue does not have the function of carrying out communications with the memory card, either.

In accordance with the above procedure, the determination controller 107 can determine the type of the host device to which the memory card is connected.

Also, the determination controller 107 carries out control as described below such that the function in accordance with the device type is provided for the user terminal or the user, etc.

If the host device is of the device type 1, it is expected as described above that the host device uses the memory card mainly as a communication interface. Accordingly, power consumption and processing performance may be improved by disabling the AP mode, disabling the Web server 105, or by combination thereof.

Also, operation history information (log) on the operation as the communication interface, statistical information or both of these pieces of information may be acquired and stored in the storage 103 so as to provide a function of providing and displaying these pieces of information on the user terminal. In this case, the Web server 105 (the first function) and the AP mode are enabled, and a user interface screen data for accepting an access from the user terminal is transmitted to the user terminal. The Web server 105 reads the information from the storage 103 and transmits the information to the user terminal in accordance with the instruction input via the user interface screen from the user terminal.

Figure 4:
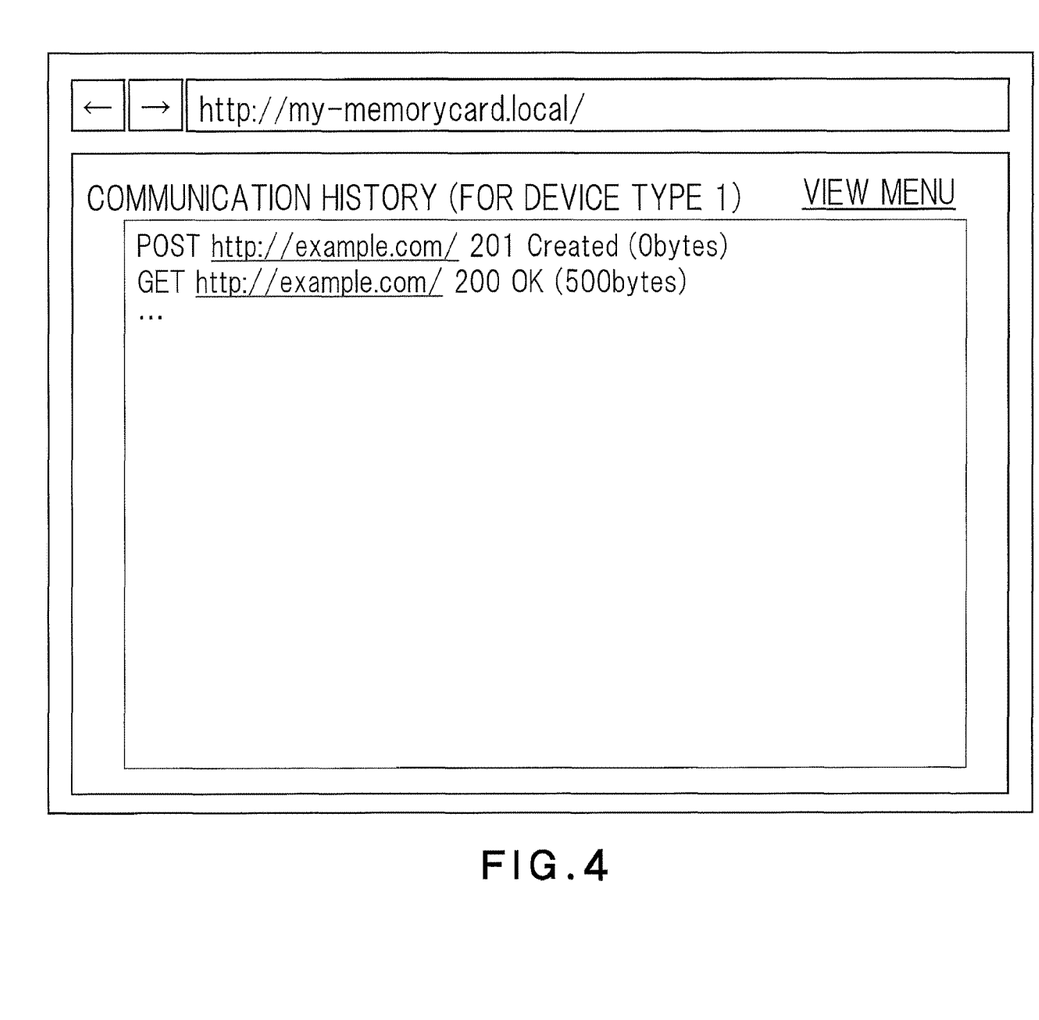
FIG. 4 is a diagram illustrating communication history obtained in a situation where the memory card is used as a communication interface.

FIG. 4 illustrates an example where communication history is displayed on the user terminal, which communication history is obtained in a situation where the host device uses the memory card as a communication interface and carries out communications with a server on an external network. In this illustrated example, HTTP communication history is displayed.

If the host device has the device type 2, then it is expected as described above that the host device uses the memory card mainly for writing and/or reading data to/from the storage 103. Accordingly, the AP mode of the wireless LAN controller 104 is enabled and a function of displaying and editing the data of the storage 103 (which is included in the first function) is enabled on the Web server 105. A user interface screen data for accessing the storage 103 is provided for the user terminal; the Web server 105 receives requests to display and/or edit the data via the user interface screen, and executes the display/edit processing in accordance with the requests. At this point, the STA mode may be disabled.

Figure 5:
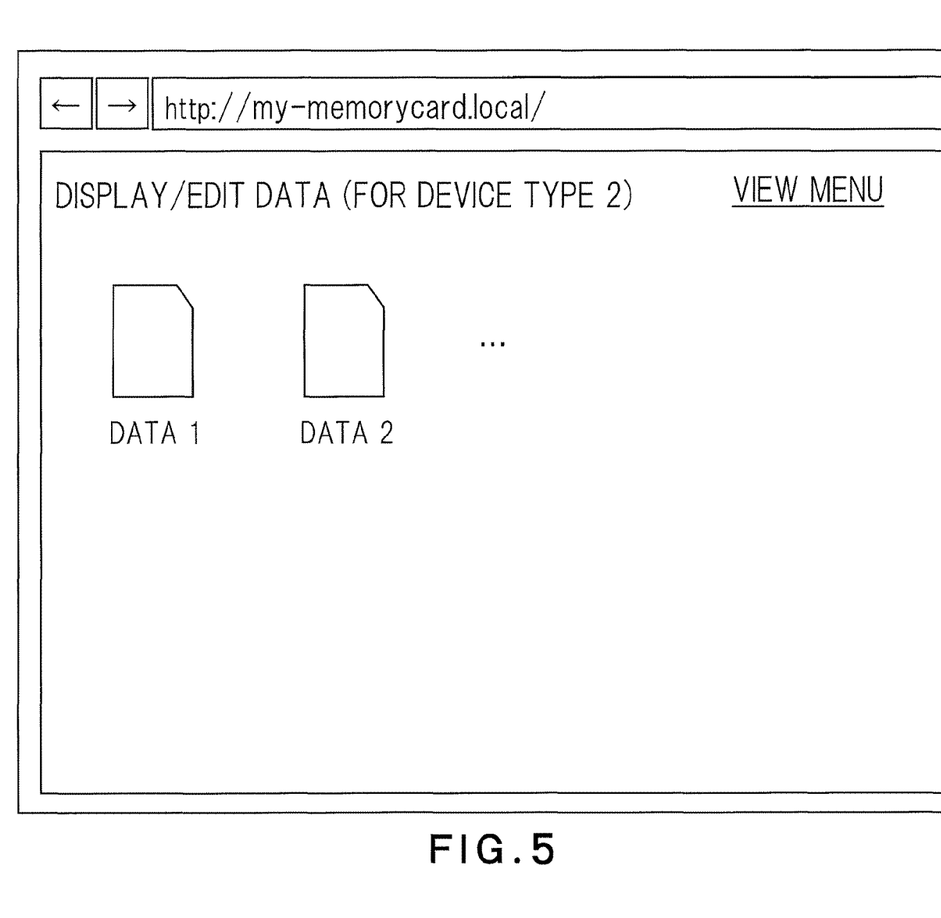
FIG. 5 is a diagram illustrating an example of a user interface screen displayed on the user terminal for displaying and editing data.

FIG. 5 illustrates an example of the user interface screen for displaying and editing the data provided by the Web server 105 for the user terminal. Operation on this user interface screen allows the user to edit the data in the storage 103.

If the host device has the device type 3, the host device can be controlled by the device controller 106 as described above. Accordingly, either the AP mode or the STA mode or both of these modes are enabled. Also, the Web server 105 provides a user interface screen for accepting instruction to control the device for the user terminal. By virtue of this, the function of controlling the device (which is included in the second function) is provided (enabled) for the user terminal. On the side of the Web server 105, when the instruction to control the device is received from the user terminal via the user interface screen, the Web server 105 notifies the content of the instruction to the determination controller 107. The determination controller 107 transmits the device control command to the host device via the device controller 106 and the SD interface 101.

Figure 6:
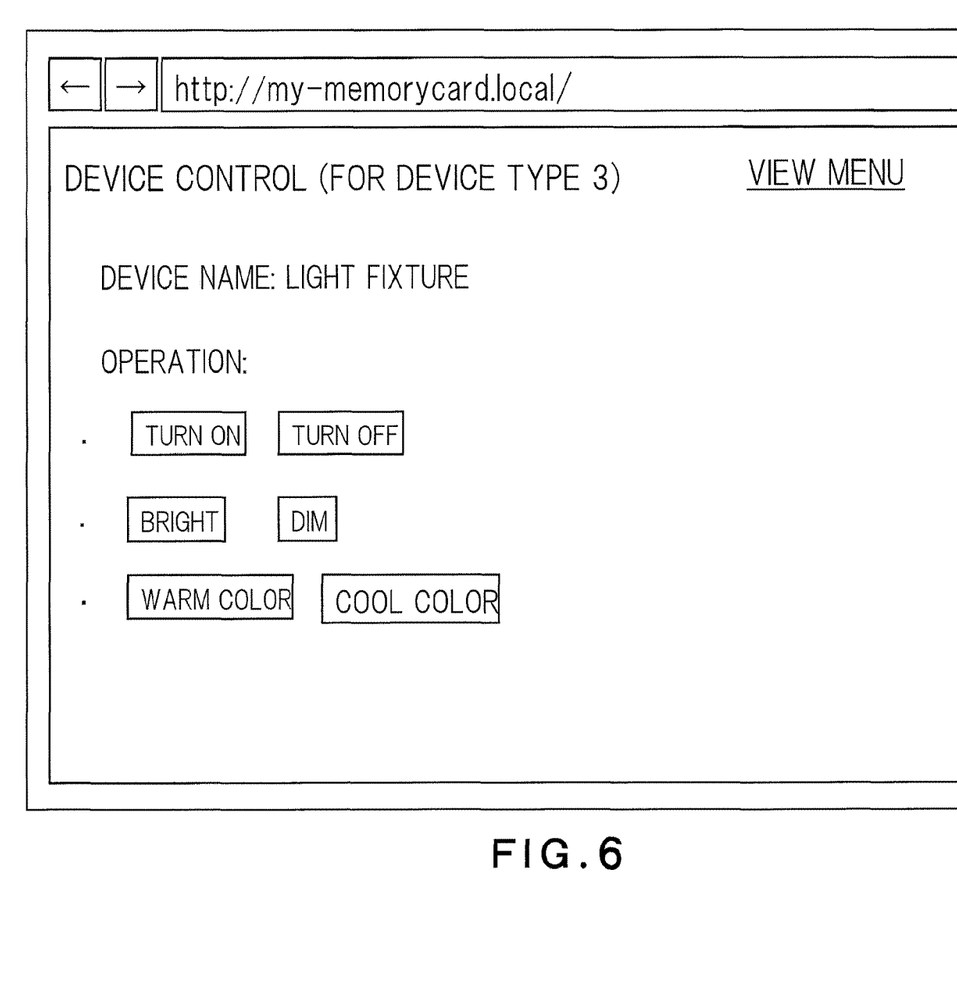
FIG. 6 is a diagram illustrating a user interface screen for device control displayed on the user terminal.

FIG. 6 illustrates a device control user interface screen to be transmitted in the AP mode from the Web server 105 to the user terminal. For example, when the user wants to turn on the light fixture, the user should select (click on) a "Turn on" button in the user interface screen. When the user wants to turn off the light fixture, the user should select (click on) a "Turn off" button in the user interface screen. In addition, luminance of the light fixture and warm and cool of the light fixture can be adjusted on this user interface. The device control command is transmitted to the host device in accordance with the instruction of the user.

Alternatively, the STA mode may be enabled, communications with the server on the Internet may be carried out, and the instruction to control the device may be received via the server. In addition, the device control command may be transmitted to the host device in accordance with the instruction. Alternatively, the AP mode may be enabled first to urge the user terminal to make settings of the STA mode, and after the settings have been made, the STA mode may be enabled. After the settings of the STA mode have been made, the AP mode may be disabled to reduce security risks. Settings of the STA mode includes, for example, setting of a parameter necessary for operation in the STA mode (SSID for the STA mode, security key (encryption key), and setting of encryption type, etc.).

When the AP mode needs to be reset (re-enabled), operation may carried out such that the reset instruction to reset the AP mode is acquired from the setting file of the storage 103, or such that the reset instruction to reset the AP mode is received from the network or the server. Alternatively, the AP mode may be adapted to be enabled again by physical operation of a switch or the like provided on the memory card.

Also, in addition to setting of the STA mode, user registration which will become necessary when issuing a transmission instruction to transmit a device control command in accordance with the control instruction from the server may be simultaneously performed. Further, setting for associating the memory card with the user may also be simultaneously performed. The content of the user registration and the association settings may be stored in the storage 103 or in the server, or in both of the storage 103 and the server.

Figure 7:
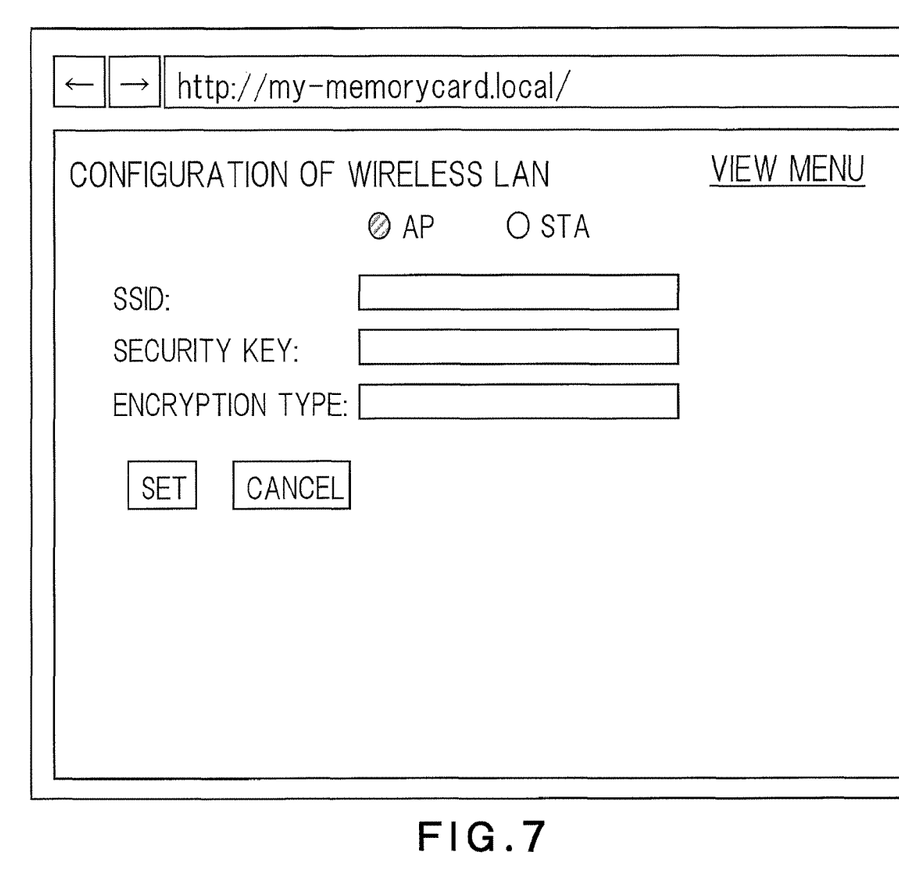
FIG. 7 is a diagram illustrating an example of a parameter setting screen.

When the AP mode or the STA mode is enabled, a function of setting parameters of the wireless LAN controller 104 as required may be provided by the Web server 105. An example of parameter setting interface screen of the wireless LAN controller 104 provided for the user terminal is illustrated in FIG. 7. In this example, a button is provided for specify whether setting of the AP mode or the STA mode should be performed. In the illustrated example, a case where the AP mode is selected is illustrated. Meanwhile, a user interface screen for the AP mode and the STA mode may be individually provided without providing such a button. A function to make transition to a Menu screen for using other functions ("View Menu" at the upper right portion of FIGS. 4 to 8 or the like) may be provided in this user interface screen or other user interface screens directed to the other functions that have been described above. In this case, it is important to present a user interface screen of the function provided for the user such that the user can most easily notice it in accordance with the device type of the host device that has been determined.

If the host device has the device type 4, the host device is not a device that can be controlled by the device controller 106 or a device that includes communication function to communicate with the memory card as has been described above. As an example of such a device, a device that only caries out power supply may be mentioned. In this case, functions of the memory card as such, or more specifically, functions that can be provided without using the device controller 106 are provided for the user terminal. Specifically, the function of displaying and editing the data of the storage 103 (see FIG. 5) may be provided. Also, a function may be enabled that allows this memory card to be used as an arithmetic device from the user terminal (which is included in the second function of the Web server 105). In this case, a user interface screen data for inputting arithmetic instructions is transmitted to the user terminal, and computation is carried out using the operator 108 on the basis of the arithmetic instructions that have been input via this user interface screen, and the results of computation are returned to the user terminal.

Figure 8:
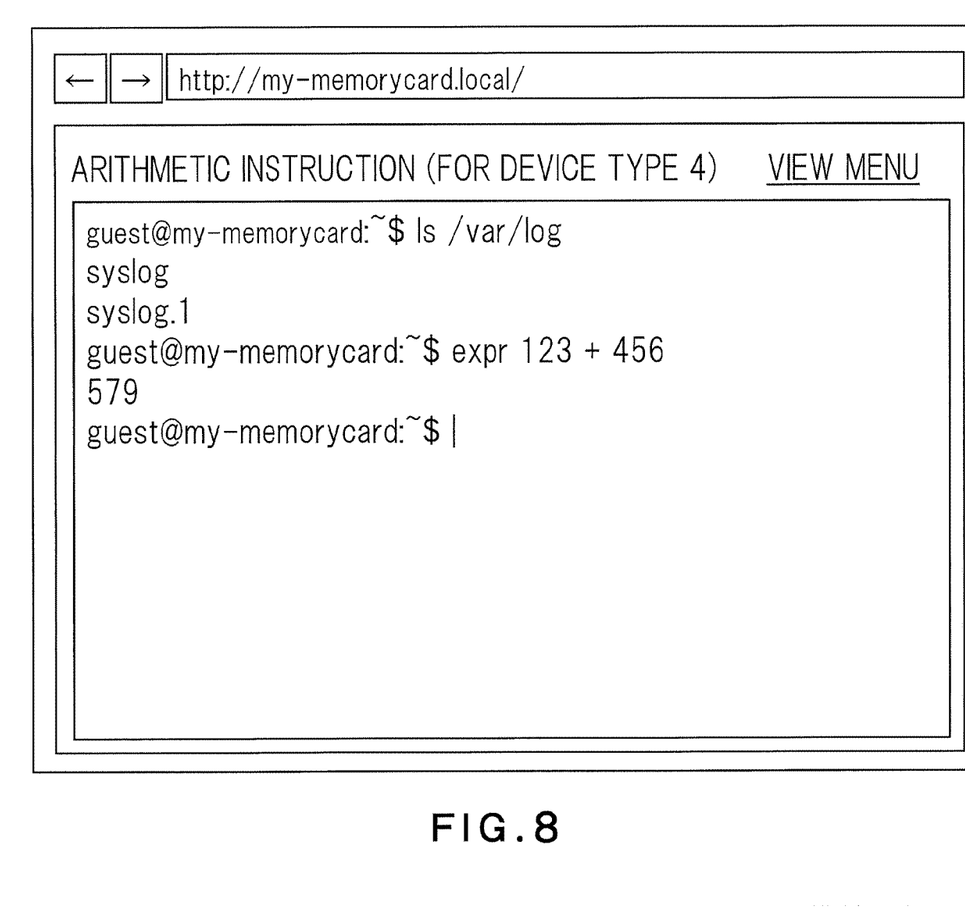
FIG. 8 is a flowchart illustrating an exemplary screen of the user terminal in a situation where the memory card is used as an arithmetic device.

FIG. 8 illustrates an example of the content of the arithmetic instruction that has been input by the user when the user terminal uses this memory card as an arithmetic device to check the files existing in the folder or to instruct computation of addition. In the first row, an instruction to check the "log" folder is input, and two files in the folder, i.e., "syslog" and "syslog.1" are returned as a response. Also, in the fourth row, addition is instructed to add "123" to "456" and "579" is returned as the result of the computation.

Figure 9:
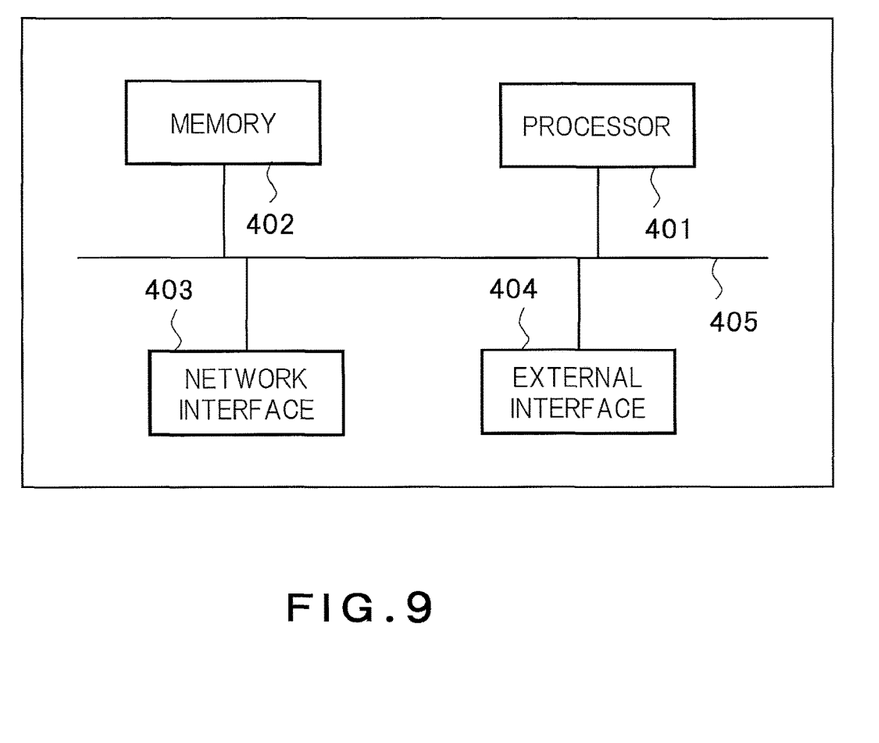
FIG. 9 is a block diagram illustrating an example of a hardware configuration of the memory card.

FIG. 9 is a block diagram that illustrates an example of a hardware configuration of the memory card. The memory card of FIG. 9 includes a processor 401, a memory 402, network interface 403, and an external interface 404. These elements are interconnected via a bus 405. The number of the individual elements is not limited to one and a plurality of any one of these elements may be provided. Although the individual elements are interconnected via one single bus in the illustrated example, they may be interconnected via a plurality of buses that are connected to each other by a bridge circuit.

The network interface 403, which is a wireless LAN interface, corresponds to the wireless LAN controller 104 of FIG. 1. The network interface 403 may include a baseband integrated circuit that carries out header processing of the data link layer such as MAC layer, header processing of the physical layer, modulation and demodulation, and the like; an AD conversion circuit; a DA conversion circuit, an RF integrated circuit that carries out analog processing and the like; and an antenna, or any other relevant element. A processor such as CPU may be arranged in the network interface 403. When TCP/IP, etc. is to be used, the processing of the TCP/IP, etc. may be carried out by the CPU on this network interface 403 or may be carried out by the processor 401 connected to the bus 405. Although only one network interface is illustrated in the illustrated example, a plurality of network interfaces may be incorporated. The network interface 403 may directly access the memory 402 by DMA (direct memory access).

The memory 402 is configured to temporarily store instructions to be executed by the processor 401 and various data, etc. to be used by the processor 401. The memory 402 may be a volatile memory such as SRAM and DRAM or a non-volatile memory such as NAND and MRAM.

The processor 401 may read programs from the memory 402 and execute the programs and thus all or part of the functions of the SD controller 102, the device controller 106, the determination controller 107, the Web server 105, the operator 108, and the wireless LAN controller 104 of FIG. 1 are achieved.

The external interface 404 is an interface for connection to the host device and corresponds to the SD interface 101 of FIG. 1.

As described in the foregoing, according to the memory card in accordance with this embodiment, the device type of the host device connected to the memory card is determined, the function in accordance with the device type is automatically selected, and the selected function is thus provided for the user terminal. Accordingly, a user does not need to, or will have little need to select for himself/herself the function that he/she needs from among various functions, so that it is made possible to increase the usability for the user.

Meanwhile, the communication apparatus in accordance with this embodiment can also be achieved, for example, by using a general purpose computer as basic hardware. Specifically, the functions of the individual blocks 102, 104, 105, 106, 107, and 108 illustrated in FIG. 1 can be achieved by causing a processor incorporated in the above computer device to execute the program. At this point, the communication apparatus may be achieved by installing in advance the above program on the computer. Alternatively, it may be achieved by storing the program in a storage medium such as CD-ROM or distributing the program via a network, and thus installing this program on the computer device as appropriate. Also, the storage 103 can be achieved by using as appropriate a memory built in or externally connected to the above computer device, hard disk, or a storage medium such as CD-R, CD-RW, DVD-RAM, and DVD-R.

The terms used in this embodiment should be construed in their broad senses. For example, the term "processor" may encompass a general purpose processor, a central processing unit (CPU), a microprocessor, a digital signal processor (DSP), a controller, a microcontroller, a state device, and the like. The term "processor" may denote, depending on the situations, an application specific integrated circuit, a field programmable gate array (FPGA), a programmable logic device (PLD), and the like. The term "processor" may denote combination of microprocessors, combination of a DSP and a microprocessor, and one or more microprocessors that operates in cooperation with a DSP core.

As another example, the term "memory" may encompass any appropriate electronic components that can store electronic information. "Memory" may denote a random access memory (RAM), a read-only memory (ROM), a programmable read-only memory (PROM), an erasable programmable read-only memory (EPROM), an electrically erasable PROM (EEPROM), a non-volatile random access memory (NVRAM), a flash memory, and a magnetic or optical data storage, which can be read by the processor. When the processor writes and/or reads information to/from the memory, it can be said that the memory carries out electrical communications with the processor. The memory may be integrated into the processor. It can be said in this case as well that the memory is carrying out electrical communications with the processor.

The present invention is not limited to the above-described embodiments as such and can be effectuated with various modifications made to the constituent components at the actual stage of implementation without departing from the scope of the present invention. Also, various inventions may be constructed by appropriate combination of the constituent components disclosed in the above embodiment. For example, some of the constituent components may be eliminated from the entire set of the constituent components presented in the context of the embodiments. Further, constituent components that pertain to different embodiments may be combined as appropriate.

The invention claimed is:

1. A communication apparatus comprising:
    a hardware interface configured to connect to a device;
    first controlling circuitry configured to detect that the device is connected to the hardware interface and to determine whether a first command from the device is received in the hardware interface within a first time period after connection to the device is detected;
    second controlling circuitry configured to transmit a second command from the hardware interface to the device when the first command is not received within the first time period; and
    communication circuitry configured to carry out wireless communication with a terminal,
    wherein
    the first controlling circuitry determines a device type for the device in accordance with whether the second command is received in the hardware interface,
    the first controlling circuitry selects a function provided for the terminal from a plurality of functions based on the device type determined for the device, and executes the selected function for the terminal, and
    the first controlling circuitry determines a first device type for the device when a response to the second command is received and a second device type for the device when the response to the second command is not received, and
    the first controlling circuitry selects a function for controlling the device from the terminal from among the plurality of functions when the first device type is determined.

2. The communication apparatus according to claim 1, further comprising:
    processing circuitry configured to transmit data for user interface screen for controlling the device via the communication circuitry to the terminal when the first device type is determined for the device,
    wherein when an instruction for controlling the device is received in the processing circuitry via the communication circuitry from the terminal, the first controlling circuitry controls the second controlling circuitry to transmit a device control command to the device.

3. The communication apparatus according to claim 1, further comprising:
    processing circuitry configured to retrieve an instruction for controlling the device via the communication circuitry,
    wherein when the first device type is determined for the device and the instruction for controlling the device is received in the processing circuitry, the first controlling circuitry controls the second controlling circuitry to transmit a device control command to the device.

4. The communication apparatus according to claim 1, further comprising:
    processing circuitry configured to execute a first function,
    wherein the processing circuitry transmits data of a user interface screen for request of execution of the first function via the communication circuitry to the terminal when the second device type is determined for the device, and
    the processing circuitry executes the first function when the processing circuitry receives the request of the execution of the first function via the user interface screen from the terminal.

5. The communication apparatus according to claim 1, wherein the first controlling circuitry determines whether a third command is received in the hardware interface after the first command is received within the first time period, and determines a third device type for the device when the third command is received, and determines a fourth device type for the device when the third command is not received,
    the communication circuitry executes either a first mode or a second mode, or both of the first and second modes in accordance with whether which of the third device type and the fourth device type is determined for the device, the first mode causing the communication apparatus to operate as a base station and the second mode causing the communication apparatus to operate as a station.

6. The communication apparatus according to claim 1, further comprising:
    a storage configured to store data; and
    processing circuitry configured to transmit to the terminal, data of user interface screen for displaying and editing the data and to execute a function of displaying or editing the data on the basis of an instruction received via the user interface screen from the terminal,
    wherein the first controlling circuitry determines whether a third command is received in the hardware interface after the first command is received within the first time period, and determines a third device type for the device when the third command is received, and determines a fourth device type for the device when the third command is not received, and
    the first controlling circuitry controls enabling and disabling of the processing circuitry in accordance with whether which of the third device type and the fourth device type is determined for the device.

7. The communication apparatus according to claim 1, wherein the communication circuitry executes a first mode or a second mode or both of the first mode and the second mode, the first mode causing the communication apparatus to operate as a base station and the second mode causing the communication apparatus to operate as a station,
    the first controlling circuitry determines an operation mode of the communication circuitry for the first mode or the second mode in accordance with the function selected for the terminal, and
    the communication apparatus further comprises processing circuitry configured to transmit data of user interface screen for setting a parameter of the first mode, a parameter of the second mode, or parameters of both the first mode and the second mode to the terminal via the communication circuitry in accordance with the operation mode determined by the first controlling circuitry.

8. The communication apparatus according to claim 1, wherein the communication apparatus is a memory card.

9. A communication method in a communication apparatus which carries out wireless communication with a terminal, comprising:
- detecting that a hardware interface of the communication apparatus is connected with a device;
- determining whether a first command from the device is received in the hardware interface within a first time period after connection with the device is detected;
- transmitting a second command from the hardware interface to the device when the first command is not received within the first time period;
- determining a device type for the device in accordance with whether the second command is received in the hardware interface;
- selecting a function provided for the terminal from a plurality of functions based on the device type determined for the device;
- executing the selected function for the terminal;
- determining a first device type for the device when a response to the second command is received and a second device type for the device when the response to the second command is not received; and
- selecting a function for controlling the device from the terminal from among the plurality of functions when the first device type is determined.

10. A non-transitory computer readable medium, having a program stored therein which when executed by a computer carrying out wireless communication with a terminal, causes the computer to perform processing of steps comprising:
- detecting that a hardware interface of the computer is connected with a device;
- determining whether a first command from the device is received in the hardware interface within a first time period after connection of the device is detected;
- transmitting a second command from the hardware interface to the device when the first command is not received within the first time period;
- determining a device type for the device in accordance with whether the second command is received in the hardware interface;
- determining a first device type for the device when a response to the second command is received and a second device type for the device when the response to the second command is not received;
- selecting a function for controlling the device from the terminal from among a plurality of functions when the first device type is determined; and
- executing the selected function for the terminal.

* * * * *